Figure 1:
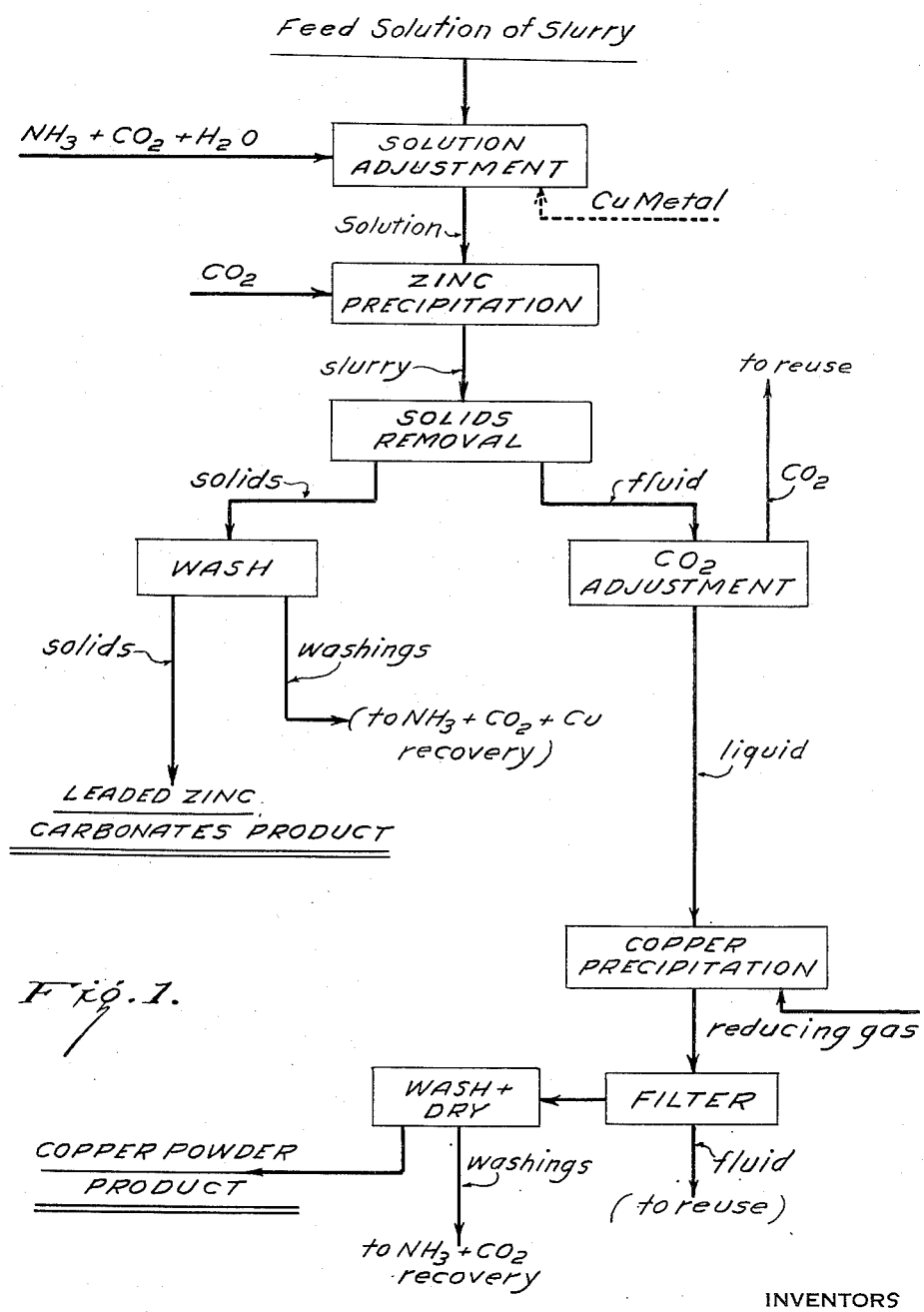

INVENTORS
FELIX A. SCHAUFELBERGER,
GEORGE VAN HARE,
PATRICK J. McGAULEY,
BY
Elmer W. Harmon ATTORNEY

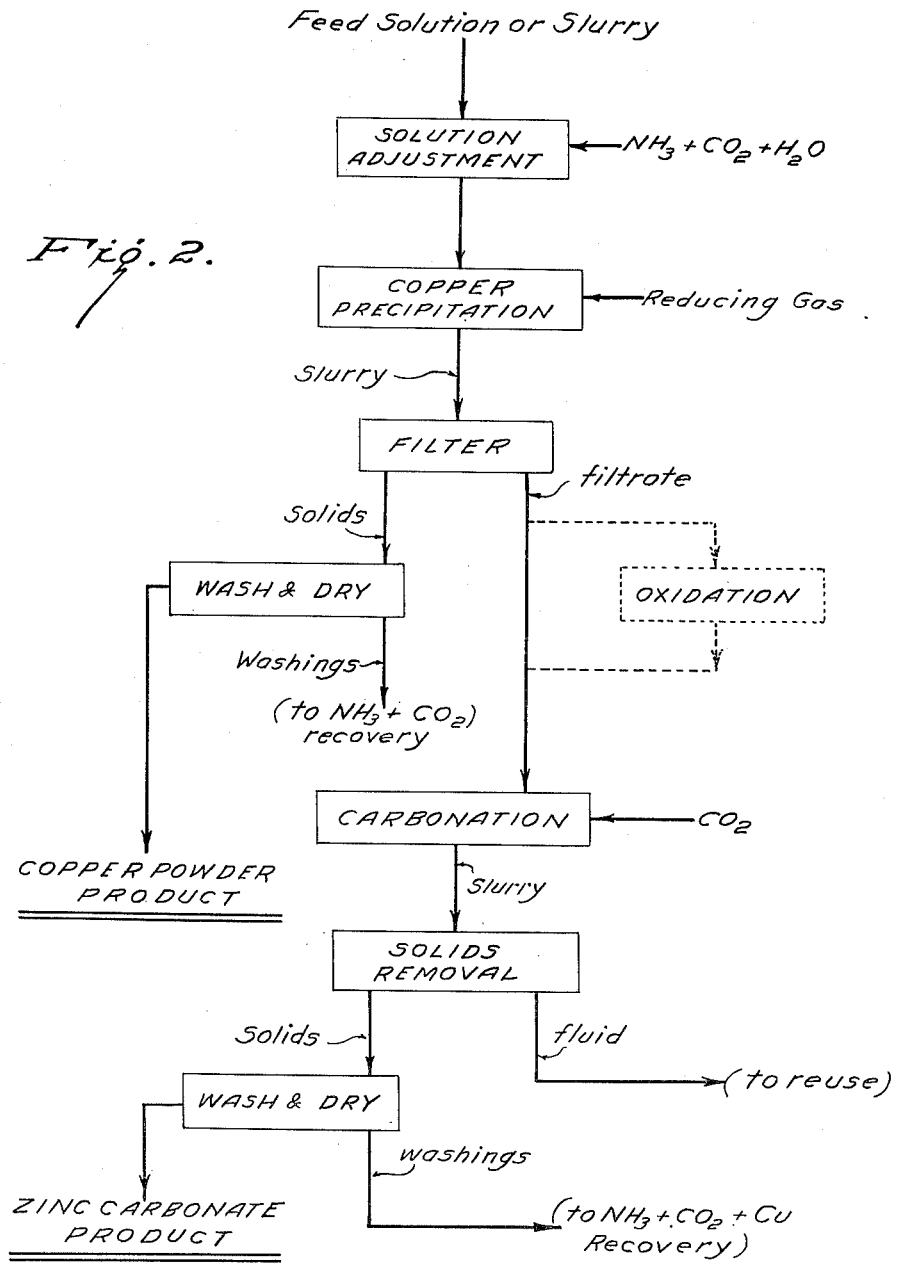

United States Patent Office 2,695,843
Patented Nov. 30, 1954

2,695,843

PRECIPITATION OF ZINC FROM LEACH LIQUORS

Felix Alfred Schaufelberger, Pelham, George Frederick Van Hare, Brooklyn, and Patrick J. McGauley, Glen Cove, N. Y., assignors to Chemical Construction Corporation, New York, N. Y., a corporation of Delaware Application September 4, 1951, Serial No. 245,064

4 Claims. (Cl. 75—120)

The present invention relates to the hydrometallurgical separation of non-ferrous metals. More particularly, it is concerned with the separation of zinc from solutions containing dissolved salts thereof. Still more specifically, it deals with the treatment of ammoniacal ammonium carbonate solutions containing dissolved carbonates of zinc, copper, and, in some cases lead, through control of both the ammoniacal and the carbonate content to produce effective zinc separation from copper.

With increasing demand for the production or recovery of non-ferrous metals, there has been a correspondingly developing interest in hydrometallurgical methods for this purpose. In the past many different proposals have been made, both of methods for dissolving the desired non-ferrous metals into solution and for obtaining product metals from the resultant solutions.

Numerous procedures have been developed that are satisfactorily effective for most purposes in dissolving the necessary metal values from various source materials. Among these are a number of systems using ammoniacal or ammoniacal ammonium carbonate liquors. These processes, or combinations of them, can be used to convert the zinc and copper content of such low-grade sources as oxide and carbonate ores and ore concentrates, metallic and non-metallic plant by-products, metal scrap and the like into soluble or solubilizable oxides, hydroxides and carbonates from which solutions containing the zinc and copper can be obtained.

However satisfactory such leaching may be, it is of little value unless the dissolved metal values can be effectively and economically recovered therefrom in a commercially acceptable form. None of the previous hydrometallurgical proposals were capable of recovering a saleable, copper-free zinc product and also electrolytic-grade copper product from solutions containing both metals. Particularly was this true when the source material, and hence the solutions, contained lead.

It is, therefore, the principal object of the present invention to devise a separatory process free from these objections. Such a process should be simple, effective and economical. It should not require unusual reagents or materials which cannot be readily regenerated for reuse. It should be capable of producing a copper product completely free from zinc and a zinc product completely free from copper, within the commercial requirements.

Surprisingly, the desired objects of the present invention have been fulfilled in an effective overall process. In general, the procedure of the process is simple. The zinc and copper values are taken into solution as complex carbonates in an ammoniacal ammonium carbonate solution. The molar equivalents of ammonia and carbon-dioxide in ammonia and the solution are carefully adjusted to the correct values for holding both metals in solution. Either before or after copper precipitation, the zinc is precipitated and removed by adjusting the carbonate and ammonia content of the solution. Copper metal is precipitated with a reducing gas. If no lead is present, copper is preferably precipitated before the zinc product is collected.

It is believed that the simplicity in operation of the present invention may be more readily illustrated by reference to the accompanying drawings in which:

Figure 1 is a simplified flowscheme showing the zinc removal sequence when lead is present; and Figure 2 is a simplified flowscheme showing the zinc removal sequence when no lead is present.

In both figures it will be seen that the first indicated step is designated as a solution adjustment. In this step a source material is treated to produce the correct conditions for holding the zinc, copper and lead, if present, in solution until it is desired that they precipitate under controlled conditions. The source material may actually be a solution or a slurry. It may have any origin so far as the present process is concerned. The liquid content will have dissolved therein at least some ammonia and ammonium carbonate and some carbonates of the metals. If a slurry, some of the latter may be present as solubilizable oxides, hydroxides or carbonates.

According to the present invention, it has been found that a solution for treatment must meet certain requirements. First, it should be sufficiently dilute to prevent deposition of solid materials by exceeding their solubility limits under the operating conditions. For example, the maximum dissolved copper content should be about the molar equivalent of 200 grams of copper metal per liter. This value must be reduced by the equivalents of zinc and lead which are in solution, since it represents the effective maximum when only copper is present. In addition, the solution must contain at least one mol equivalent of ammonium carbonate for each mol equivalent of dissolved zinc, copper and lead. Still further, the solution must contain two mol equivalents of "uncarbonated" ammonia for each mol of dissolved copper and four for each mol equivalent of dissolved zinc. A slight excess, both of ammonia and ammonium carbonate, should be used to insure any necessary reaction but a large excess is unnecessary, wasteful and should be avoided. The term "uncarbonated" as used in this discussion represents ammonia which is present in or added to the solution in excess of the carbonate content available for forming ammonium carbonate. This term is used since it is not certain in what form this $NH_3$ becomes associated with the metals.

Accordingly, in a step designated as the solution adjustment in both drawings, this condition is brought about. The feed solution or slurry is adjusted by suitable addition of ammonia, carbon dioxide and/or ammonium carbonate and water to meet these requirements.

When lead is in solution it will only be to a small extent, since lead carbonates, as compared with those of zinc and copper, are not particularly soluble under the operating conditions. However, this small amount of lead tends to be precipitated with either the zinc or copper product, depending upon which is taken first. Since it is intended that a by-product of the zinc separation of this invention should be an electrolytic-grade copper powder, lead should be removed before this product is taken. It is not a particularly objectionable contaminant in the zinc product. Accordingly, if lead is present in the feed material, the zinc product is taken before the copper. This procedure is shown in Figure 1.

Solution from the adjustment operation is passed to a suitable carbonator. This may take any desired form or sequence and can be carried out in simple tanks by adding carbon dioxide under suitable pressure. Enough $CO_2$ should be added to convert to carbonates a large proportion of uncarbonated ammonia associated with the zinc. This ammonia content is reduced to a value which is inadequate to hold zinc carbonate in solution.

According to the present invention it has been found that for some reason ammonia, which is associated with zinc, is carbonated selectively sufficiently to precipitate zinc before the solubility limit for copper is exceeded. Carbon dioxide should not be introduced in sufficient amount to appreciably convert the uncarbonated ammonia content associated with copper, to less than about the two mol equivalents per mol of copper carbonates which keeps the latter in solution. Carbon dioxide may be obtained from any suitable source, whether a separate one or as a result of recovery in some subsequent operations with which the present invention is not necessarily concerned.

The only necessary considerations in introducing the carbon dioxide is to use a sufficient pressure to insure absorption in a reasonable length of time. Accordingly, any suitable pressure applied for sufficient time may be used. However, at below about five pounds per sq. in. operation is too slow and is wasteful of apparatus capacity. On the other hand, while pressures above about 50 pounds and up to 100 or more may be used, there is no economic justification for their use. A good operating practice is at about 25–30 pounds.

Carbonation may be carried out under these conditions either batchwise or continuously, depending upon the overall process set-up. Treatment is continued, usually through use of a timed cycle determined for the operating conditions, until zinc precipitation substantially ceases.

The zinc precipitate is then separated from the residual liquor. It makes little difference whether this is done before or after pressure release, although the latter is simpler. A preferred separation is the use of a continuous filter. However, the apparatus used is not an essential limitation. Decantation, centrifugal separation, or any other equivalent mechanical expedient may be used.

The precipitated solids so removed will be a composite mixture. It will include ammonium carbonate and bicarbonates, basic zinc carbonate containing some 10% ammonia and in some case copper carbonates, which precipitate if the solution is over carbonated. Carbonation control, as indicated above, however, will minimize copper precipitation at this stage.

The collected solids are washed to recover the ammonium carbonates content and those of copper, if any. Washing should be done with cool or cold water to prevent dissolving the zinc precipitate to excess. It is appreciably soluble at above about 70° F. The washings are treated to recover their copper, ammonia and carbonate contents. This recovery may be worked out along several flowlines with which the present invention is not concerned. One method would be to strip off $CO_2$ and $NH_3$, recycling them for reuse, removing the copper content as by cementation, or some equivalent, and discarding stripped water.

Cuprous carbonates are more easily redissolved than cupric. If in the cycle used it is found that copper is coming down with the zinc in appreciable amounts one or both of two steps should be taken. First, carbonation should be better controlled. Second, care should be taken that at least half the dissolved copper should be in cuprous condition to minimize cupric precipitation. This will be true of liquors usually encountered from ammoniacal leaching so that it ordinarily is not a limitation. If cupric reduction is required, it is easily done by dissolving a little copper metal in the solution during the adjustment step. This is shown in dotted line in Figure 1.

The washed solids represent a leaded-zinc carbonates precipitate. They will usually contain about 10% ammonia. They are readily saleable as such. If so desired, they can be treated by steam stripping to remove ammonia and/or by calcining to also remove carbon dioxide. In the latter case, the resultant leaded zinc oxide can be sold as such.

Returning to the fluid product from the solid separation step in Figure 1, it will be seen that it is treated to recover copper. This copper precipitation may be done in any desired manner. One preferred embodiment is by high temperature treatment with a reducing gas. In accordance with the process of the present invention, it has been found that the carbon dioxide content of this fluid, per se or as carbonate equivalents, is a critical factor in reducing copper. The carbonate content of the solution, after zinc precipitation, is usually too high for effective gas reduction of copper. In ordinary use it is usually from about 150 to about 200 grams per liter. In some cases, however, it may be as low as about 120. It should be reduced, if necessary, to about 60–70% by weight of the copper content of the filtrate, whatever that may be. This adjustment may be carried out by simple heating. The evolved carbon dioxide should be recovered and reused. This step is shown as a $CO_2$ adjustment.

Adjusted liquor is sent to some copper recovery system. While other methods may be used, a preferred embodiment is to treat the solution temperatures to above 250° F. with a suitable sulfur-free reducing gas such as hydrogen, carbon monoxide mixtures thereof and the like. The reducing gas should be sulfur-free. A preferred temperature range is about 300°–400° F., when CO is the reducing gas and 350°–500° F. when using hydrogen. Treatment conditions are maintained until precipitation is substantially complete. The precipitated copper is removed, washed and dried in a conventional manner. The liquor is recycled, usually in part for absorbing $CO_2$ or $NH_3$ which has been evolved in various recovery systems, and in part for making up additional feed solution or slurry. The particular method of recirculation is not a critical limitation.

In Figure 2, the arrangement preferred when little or no lead is in the source material is shown. Here copper is removed first, it having been found that the ammonia and ammonium carbonate necessary to hold the zinc in solution does not interfere with copper precipitation under the same conditions outlined above. Again the solution, in this case directly after adjustment, is treated with a reducing gas at elevated temperatures until copper is precipitated down to the small equilibrium value which remains unreduced. Under the conditions outlined, copper is precipitated in saleable grade in high yield. The precipitated metal is collected, washed and dried and the washings treated to recover $NH_3$ and $CO_2$ for reuse as noted above. Precipitation is stopped when copper of less than electrolytic grade begins to precipitate.

The filtrate containing the original zinc and some copper is then treated to remove the zinc product. This is done by carbonation, collection, washing and drying in the same manner as was discussed above. The zinc product is recovered as an ammoniated carbonate, as carbonates or as oxide. The residual liquor is recycled. Part may be used in absorbing $NH_3$ or $CO_2$ recovered from washing liquors. The remainder is recycled to make additional feed solution or slurry by whatever the method used for that purpose.

One additional feature is noted as an optional flow in Figure 2. If the zinc-copper ratio in the liquor before zinc precipitation is less than about 3:1, the liquor should be given a mild oxidation with an oxygen-bearing gas to place an appreciable part of the copper in cupric condition in which it does not readily precipitate with zinc. Above about this ratio this precaution can ordinarily be omitted. In the usual case this oxidized copper will be recycled as cupric copper available for leaching more copper, copper oxides or carbonates. Oxidation is usually done expressly for this purpose during leaching in any case. Accordingly, it is not a wasteful step here. It may be done in any desired manner. Several, such as the use of counter-current towers, injection under pressure, etc., are well known for the purpose of converting cuprous to cupric copper. The oxidation method used is not critical.

The invention will be further illustrated by the following examples:

Example 1

A solution containing about 140 grams per liter of copper, about 90 grams per liter of which is cuprous copper, 65 grams per liter of zinc, 115 grams per liter of lead and having ammonia and carbonate contents of 175 grams per liter of ammonia and 140 grams per liter of carbon dioxide is carbonated at 50 pounds per sq. in. gauge. Filtration of the resulting slurry yields a fluid containing about 165 grams per liter of copper, 135 grams per liter of ammonia, 170 grams per liter of $CO_2$, 8 grams per liter of zinc and about 0.09 grams per liter of lead. The $CO_2$ concentration is reduced to about 130 grams per liter by heating the fluid at 180° F., after which it is treated with 2 grams per liter of barium oxide. The lead content after filtration is 0.03 grams per liter. The $CO_2$ content of the fluid is adjusted by heating at 350° F. and 150 pounds per sq. in. gauge until $CO_2$ evolution ceases. The pressure is then increased to 900 pounds per sq. in. gauge by introducing hydrogen. After 90 minutes, the treatment is stopped and the precipitated copper collected. After washing the precipitate is found to represent a yield of 120 grams per liter of original solution assaying 99.91% copper, while the residual liquor was found to contain 20 grams per liter of cuprous copper.

Example 2

A solution containing about 140 grams per liter of copper, about 99 grams per liter of which was cuprous copper, 65 grams per liter of zinc and equivalents of about 175 grams per liter of ammonia and 135 grams per liter of $CO_2$ is heated to about 350° F. in an autoclave and the pressure increased to 900 pounds per sq. in. gauge by introducing hydrogen. The conditions are maintained for 1½ hours after which the autoclave is pressure relieved and the solids collected. After washing and drying, the solids are found to represent a yield of about 120 grams per liter of original solution assaying 99.91% copper. Carbonation of the residual liquor at 50 pounds per sq. in. gauge results in a precipitated zinc product representing about 59 grams per liter of original solution. The liquor, which is recycled, contains about 135 grams per liter of ammonia, 170 grams per liter of $CO_2$, about 20 grams per liter of copper and 6 grams per liter of zinc.

We claim:

1. The improved process of separating zinc from aqueous ammoniacal liquors containing carbonates of zinc and copper, which comprises adjusting the total content of dissolved molar equivalents of $NH_3$ and $CO_2$ to provide in the solution at least (a) about one mol equivalent of $(NH_4)_2CO_3$ for each mol of dissolved Zn and Cu, (b) about two mol equivalents of uncarbonated $NH_3$ for each mol of dissolved Cu, and (c) about four mol equivalents of uncarbonated $NH_3$ for each mol of dissolved Zn; then absorbing into solution additional mols of $CO_2$ whereby the mol equivalents of uncarbonated $NH_3$ associated with zinc are selectively reduced to less than about four mols per mol of originally dissolved zinc; continuing $CO_2$ addition, whereby zinc value is precipitated and collecting resultant precipitate.

2. A process according to claim 1 in which substantially copper-free zinc-bearing precipitate is obtained, characterized in that the $CO_2$ addition is stopped before the uncarbonated $NH_3$ associated with copper: dissolved copper mol ratio becomes less than about two.

3. The improved process of separating zinc from aqueous ammoniacal liquors containing carbonates of zinc and copper, which comprises adjusting the total content of dissolved molar equivalents of $NH_3$ and $CO_2$ to provide in the solution at least (a) about one mol equivalent of $(NH_4)_2CO_3$ for each mol of dissolved Zn and Cu, (b) about two mol equivalents of uncarbonated $NH_3$ for each mol of dissolved Cu, and (c) about four mol equivalents of uncarbonated $NH_3$ for each mol of dissolved Zn; then absorbing into solution additional mols of $CO_2$ whereby the mol equivalents of uncarbonated $NH_3$ associated with zinc are selectively reduced to less than about four mols per mol of originally dissolved zinc; continuing $CO_2$ addition, whereby zinc value is precipitated; collecting resultant precipitate; and heating collected precipitate to remove $NH_3$, whereby the zinc is recovered as basic zinc carbonate.

4. The improved process of separating zinc from aqueous ammoniacal liquors containing carbonates of zinc and copper, which comprises adjusting the total content of dissolved molar equivalents of $NH_3$ and $CO_2$ to provide in the solution at least (a) about one mol equivalent of $(NH_4)_2CO_3$ for each mol of dissolved Zn and Cu, (b) about two mol equivalents of uncarbonated $NH_3$ for each mol of dissolved Cu, and (c) about four mol equivalents of uncarbonated $NH_3$ for each mol of dissolved Zn; then absorbing into solution additional mols of $CO_2$ whereby the mol equivalents of uncarbonated $NH_3$ associated with zinc are selectively reduced to less than about four mols per mol of originally dissolved zinc; continuing $CO_2$ addition, whereby zinc value is precipitated and collecting resultant precipitate; heating the collected precipitate to remove $NH_3$, $CO_2$ and water vapor, whereby the zinc is recovered as zinc oxide.

References Cited in the file of this patent

UNITED STATES PATENTS

| Number | Name | Date |
|---|---|---|
| 654,804 | Rigg | July 31, 1900 |
| 1,640,708 | Laury | Aug. 30, 1927 |
| 1,686,391 | Muller et al. | Oct. 2, 1928 |
| 1,854,664 | Ogden | Apr. 19, 1932 |
| 2,488,201 | Kenny et al. | Nov. 15, 1949 |

FOREIGN PATENTS

| Number | Country | Date |
|---|---|---|
| 287,186 | Great Britain | Mar. 19, 1928 |

OTHER REFERENCES

Latimer, W. M., "The Oxidation States of the Elements and Their Potentials in Aqueous Solutions," Prentice-Hall, Inc., New York, N. Y.; first edition (1938), pages 3, 4 and 299–301.